Aug. 19, 1958 I. HOROWITZ 2,848,617
PHASE DETECTOR AND OSCILLATOR SYSTEM
Filed May 14, 1957
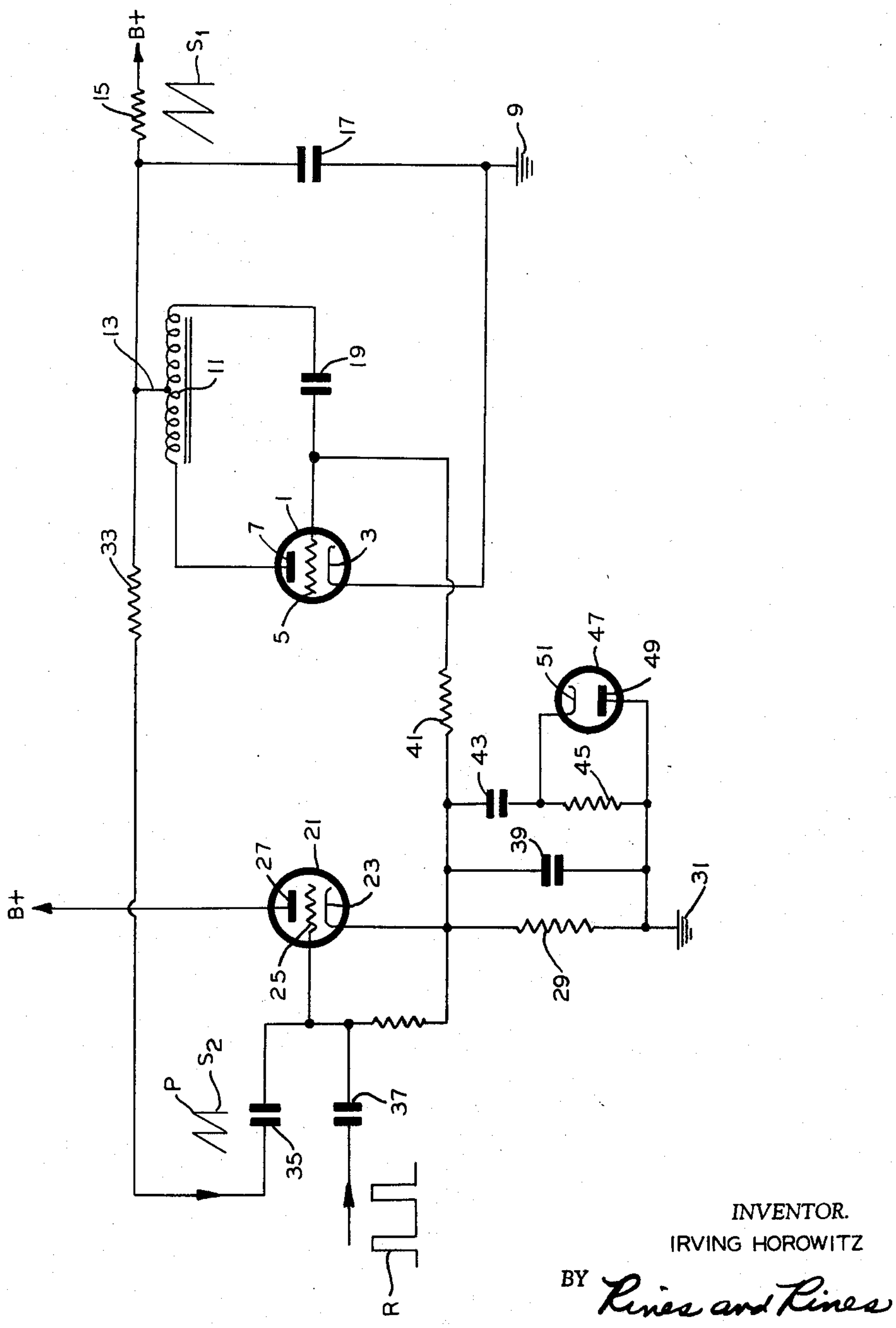
INVENTOR.
IRVING HOROWITZ
BY Rines and Rines
ATTORNEYS United States Patent Office 2,848,617

Patented Aug. 19, 1958

2,848,617

PHASE DETECTOR AND OSCILLATOR SYSTEM

Irving Horowitz, Eatontown, N. J., assignor to U. V. Mfg. Corp., Newark, N. J., a corporation of New Jersey Application May 14, 1957, Serial No. 659,088

4 Claims. (Cl. 250—36)

The present invention relates to phase detector and oscillator systems, and, more particularly, to systems for comparing the phase of the oscillations produced by an oscillator with reference oscillations, and rapidly controlling the oscillations in accordance with error voltages obtained as result of the phase comparison.

Numerous types of automatic frequency-control circuits have been proposed for controlling the frequency and/or phase of oscillations produced by an oscillator. Certain unique problems arise, however, in particular oscillator systems in which the oscillations are compared with a train of impulses which may have substantial quiescent periods. During such quiescent periods, the system may be attendant with considerable noise and other disadvantageous features. In the specific case of closed-circuit television, for example, during the transmission of the vertical synchronization pulses, no horizontal-sweep pulse information is customarily transmitted. This, of course, is the antithesis of conventional television and related systems. The horizontal sweep oscillator cannot therefore be controlled during the period when no horizontal sweep-pulse information is applied, introducing disadvantageous results. Specifically, when the horizontal sweep pulses are suddenly re-applied, the horizontal sweep oscillator becomes pulled into lock with the pulses, but the picture appearing on the tube has been found to curl at the edges. This means that the error voltage, produced upon the re-application of the sweep pulses, is not instantaneously applied to control the oscillator, but, because of the time constants of the control circuit, requires a finite time to take effect, thus causing the picture to curl. This curling may be overcome by greatly increasing the response of the time constants in the error circuit network. When this is done, however, the sudden application of error voltage, upon the re-application of horizontal-sweep pulse information following a quiescent period, gives rise to overshoots and transient oscillations that cause the sweep oscillator correspondingly to fluctuate or wobble, producing a noticeable undesirable wobbling or hunting along the vertical edge of the picture. The art has had to put up, however, with compromises between the undesirable curling effect of relatively low-time constants and the wobbling effect of fast-time constants in the error circuit.

An object of the present invention, however, is to provide a new and improved system that shall completely obviate the above-described difficulty and that shall permit the sweep oscillator rapidly to become locked with the horizontal sweep-pulse information upon the re-application of the same after a quiescent period, and without picture curling or wobbling effects.

A further object is to provide an electric system embodying an oscillator and a phase detector of more general application.

Other and further objects will be explained hereinafter and will be more particularly pointed out in the appended claims.

In summary, the above ends are attained through comparing the phase of the oscillations of the oscillator with impulses of predetermined reference frequency in order to obtain an error voltage that may be applied to control the oscillator. An electric network is connected in the phase detector output and is coupled to the input of the oscillator, the network comprising a series-connected capacitor and resistor. The time constant of that network is made sufficiently short that substantially instantaneous response to the variations in the said error voltage is produced. By connecting rectifying means in parallel with the said resistor and in appropriate polarity, oscillations in the substantially instantaneous response of the network to a variation in the error voltage are suppressed. An electrical connection from the terminal of the said capacitor remote from the rectifying means to the oscillator input will thus control the phase of the oscillator oscillations in accordance with the response of the network without the wobbling or curling before-described.

The invention will now be described in connection with the accompanying drawing, the single figure of which is a schematic circuit diagram illustrating the invention in preferred form.

An oscillator 1, shown for illustrative purposes as of the blocking-oscillator triode variety, comprises a cathode 3, a control-grid electrode 5 and a plate or anode 7. The cathode 3 is preferably grounded, as at 9, and the plate or anode 7 is connected through the left-hand portion of the blocking-oscillator transformer winding 11 to a conductor 13 and thence through a resistor 15 to the positive or B+ terminal of the plate supply source. The negative terminal of the plate supply source may constitute the ground terminal 9. The term "ground" as herein used is intended to connote not only actual earthing but also chassis or other reference potential. Connected between the conductor 13 and the ground terminal 9 is a capacitor 17. The grid capacitor of the blocking oscillator is shown at 19 connected between the control-grid electrode 5 and the right-hand terminal of the blocking-oscillator transformer winding 11. Further description of the operation of the blocking oscillator will not be presented since this is conventional and well-known and it is not desired to confuse the features of novelty of the present disclosure. Suffice it for present purposes to state that there will be produced across the resistor 15 the substantially saw-tooth wave-form oscillations $S_1$ illustrated therebelow.

The blocking oscillator 1 is controlled by direct-current and superposed transient error voltages obtained from a phase detector electron tube 21, shown comprising a cathode 23, a control-grid electrode 25 and an anode or plate 27. The anode or plate 27 is preferably directly connected to the B+ terminal, and the cathode is connected through a cathode-load resistor 29 to a ground terminal 31 which connects with the before-mentioned ground terminal 9. A sample $S_2$ of the oscillations produced by the oscillator 1 is fed back by conductor 13 through an impedance, such as a resistor 33, and a coupling condenser 35 to the control-grid electrode 25 of the phase-detector tube 21. Applied, also, to the control-grid electrode 25, through a coupling capacitor 37, is a train of reference impulses of predetermined frequency, such as the rectangular impulses R shown to the left of the capacitor 37 and corresponding, for example, to horizontal sweep information. The period of the rectangular impulses R is preferably less than the period of the saw-tooth oscillations so that a comparison of the phase of the rectangular impulses with a predetermined portion of the saw-tooth oscillations near the peaks P thereof may be effected in the phase detector 21. Depending upon the phase differences between the saw-tooth oscillations produced by the oscillator 1 and the reference horizontal rectangular impulses R, there will result across the cathode-load resistor 29 of the phase detector 21 a direct-current error voltage or potential. A by-pass condenser 39 is shown shunting the cathode-load resistor 29. The error voltage so produced is applied through a resistor 41 to the control-grid electrode 5 of the oscillator 1 to control the oscillation frequency and phase of the oscillator 1 in accordance with the value of the direct-current error potential.

An electric network, comprising the series-connected capacitor 43 and resistor 45, is shown connected in parallel with the cathode-load resistor 29. If, as before stated, the time constant of this network is made sufficiently fast to respond instantaneously at the moment when the horizontal rectangular impulses R are re-applied through capacitor 37, after a substantial quiescent period of transmission of vertical sweep information, the error voltage will overshoot and a train of oscillations will result. These oscillations will be conveyed through the resistor 41 and will correspondingly modulate or wobble the oscillations of the oscillator 1, producing the before-mentioned undesirable wobble or hunting of the border of the picture displayed on the cathode-ray tube with which the oscillator 1 is to operate. If, on the other hand, the time constant is made sufficiently low to avoid any such train of oscillations, the network 43, 45 will respond relatively slowly and thus gradually bring the oscillator 1 into locked phase reference, producing the curling at the edges of the picture, which is equally undesirable.

In accordance with the present invention, both these undesirable traits are eliminated through making the values of the elements 43 and 45 such that their time constant is sufficiently short to respond substantially instantaneously to variations in the error voltage, but preventing any overshoot or oscillation of the error voltage. In particular, the time constant of the network 43, 45 is fast enough instantaneously to respond to the production of the error voltage at the cathode 23 of the phase detector 21 at the instant that the horizontal rectangular impulses R are re-applied, after a period of quiescence. Through providing the rectifier 47, however, with its anode or plate electrode 49 and cathode electrode 51 connected across the resistor 45 in appropriate polarity, any overshoot of the instantaneous response of the network 43, 45 is immediately short-circuited, so that any train of oscillation produced by the rapid response of the network is substantially suppressed. Even the sudden advent, therefore, of the error voltage or any other variation of the error voltage will permit the application of the direct-current error voltage impulse through the resistor 41 to the control-grid electrode 5 of the blocking oscillator 1 without the customary overshoot or oscillation train that is normally caused by such instantaneous reaction or response. In effect, therefore, the present invention provides a horizontal oscillator automatic-frequency control with a high degree of noise immunity.

Further modifications will occur to those skilled in the art and all such are considered to fall within the spirit and scope of the invention as defined in the appended claims.

What is claimed is:

1. An electric system having, in combination, an oscillator having an input and an output, a phase detector having an input and an output, means for connecting the oscillator output to the phase detector input to apply to the phase detector a sample of the oscillations produced by the oscillator, means for applying impulses of predetermined reference frequency to the phase detector input in order to compare the phase of the reference frequency impulses with the phase of the oscillations produced by the oscillator, thereby to produce a direct-current error voltage in the output of the phase detector representative of the difference in phase between the reference frequency impulses and the said oscillations, an electric network connected in the said phase detector output and comprising a series-connected capacitor and resistor, the time-constant of the network being sufficiently short to respond substantially instantaneously to variations in the said error voltage, rectifying means connected in parallel with the said resistor in polarity such as to suppress oscillation in the substantially instantaneous response of the network to a variation in the said error voltage, and an electrical connection from the terminal of the said capacitor remote from the rectifying means to the oscillator input for controlling the phase of the oscillations in accordance with the said response of the network.

2. An electric system having, in combination, a blocking oscillator having an input and an output, a phase detector electron device having an input and a cathode-load output, means for connecting the oscillator output to the phase detector input to apply to the phase detector a sample of the oscillations produced by the oscillator, means for applying impulses of predetermined reference frequency to the phase detector input in order to compare the phase of the reference frequency impulses with the phase of the oscillations produced by the oscillator, thereby to produce a direct-current error voltage in the cathode-load output of the phase detector representative of the difference in phase between the reference frequency impulses and the said oscillations, an electric network connected across the phase-detector cathode-load output and comprising a series-connected capacitor and resistor, the time-constant of the network being sufficiently short to respond substantially instaneaneously to variations in the said error voltage, rectifying means connected in parallel with the said resistor in polarity such as to suppress oscillation in the substantially instantaneous response of the network to a variation in the said error voltage, and an electrical connection from the terminal of the said capacitor remote from the rectifying means to the oscillator input for controlling the phase of the oscillations in accordance with the said response of the network.

3. An electric system having, in combination, a substantially saw-tooth wave-form oscillator having an input and an output, a phase detector having an input and and output, means for connecting the oscillator output to the phase detector input to apply to the phase detector a sample of the saw-tooth oscillations produced by the oscillator, means for applying substantially rectangular impulses of period less than the saw-tooth oscillations of predetermined reference frequency to the phase detector input in order to compare the phase of the reference frequency impulses with the phase of a predetermined portion of the saw-tooth oscillations produced by the oscillator, thereby to produce a direct-current error voltage in the output of the phase detector representative of the difference in phase between the reference frequency impulses and the said oscillations, an electric network connected in the said phase detector output and comprising a series-connected capacitor and resistor, the time-constant of the network being sufficiently short to respond substantially instantaneously to variations in the said error voltage, rectifying means connected in parallel with the said resistor in polarity such as to suppress oscillation in the substantially instantaneous response of the network to a variation in the said error voltage, and an electrical connection from the terminal of the said capacitor remote from the rectifying means to the oscillator input for controlling the phase of the oscillations in accordance with the said response of the network.

4. An electric system having, in combination, a blocking oscillator for producing substantially saw-tooth oscillations having an input and an output, a phase detector electron device having an input and a cathode-load output, means for connecting the oscillator output to the phase detector input to apply to the phase detector a sample of the saw-tooth oscillations produced by the oscillator, means for applying substantially rectangular impulses of period less than the saw-tooth oscillations of predetermined reference frequency to the phase detector input in order to compare the phase of the reference frequency impulses with the phase of a predetermined portion of the saw-tooth oscillations produced by the oscillator, thereby to produce a direct-current error voltage in the cathode-load output of the phase detector representative of the difference in phase between the reference frequency implses and the said oscillations, an electric network connected across the phase-detector cathode-load output and comprising a series-connected capacitor and resistor, the time-constant of the network being sufficiently short to respond substantially instantaneously to variations in the said error voltage, rectifying means connected in parallel with the said resistor in polarity such as to suppress oscillation in the substantially instantaneous response of the network to a variation in the said error voltage, and an electrical connection from the terminal of the said capacitor remote from the rectifying means to the oscillator input for controlling the phase of the oscillations in accordance with the said response of the network.

No references cited.